July 11, 1967 G. W. JORDAN, JR., ET AL 3,331,030

AUTOMATIC GAIN CONTROL CIRCUIT

Filed Aug. 20, 1963 2 Sheets-Sheet 1

INVENTORS G. W. JORDAN, JR.
N. K. LUND
BY
G. E. Hirsch Jr.
ATTORNEY

July 11, 1967 G. W. JORDAN, JR., ET AL 3,331,030

AUTOMATIC GAIN CONTROL CIRCUIT

Filed Aug. 20, 1963 2 Sheets-Sheet 2

United States Patent Office 3,331,030

Patented July 11, 1967

3,331,030

AUTOMATIC GAIN CONTROL CIRCUIT

George W. Jordan, Jr., Parsippany, and Nean K. Lund, Berkeley Heights, N.J., assignors to Bell Telephone Laboratories, Incorporated, New York, N.Y., a corporation of New York Filed Aug. 20, 1963, Ser. No. 303,731
7 Claims. (Cl. 330—145)

This invention relates to apparatus for, and a method of automatically controlling the transmission gain of electrical circuits. More particularly, it is concerned with means for maintaining an essentially constant level in the circuits of a signal receiver despite widely varying field intensities at the receiver input or gain variations in the circuits themselves.

It is customary in signal receiving circuits to maintain relatively constant output amplitude by comparing the amplitude or other characteristic of a signal passed through the circuit to a standard reference value and suitably adjusting the circuits if a sufficient difference is found to exist. The reference may either by derived as an average of message signal values or from a fixed reference. Such a system, commonly called an automatic gain control circuit, is relatively simple to implement so long as a continuous signal stream passes through the amplifier. If, however, there is a prolonged absence of signals, internal circuit variations may result in a substantial alteration of the gain characteristic of the circuit so that, with the resumption of received signals, appreciable time is required before the nominal transmission gain of the circuit is re-established. Further, nonuniformity of response across the transmission band of the unit may give rise to gain variations which, particularly in the absence of signals for a relatively long interval, can cause serious changes in circuit gain.

In systems in which long periods devoid of signals are the rule rather than the exception, provision is ordinarily made for supplying periodic pilot pulses, or the like, of fixed amplitude so that the gain of the circuit will, without exception, be periodically adjusted. The amplitude of each received pilot pulse is compared to a reference and the resulting difference, if any, is used to adjust the gain of the stage. Infrequent pilot pulses, particularly if they are of short duration, are not sufficient, however, to effect the necessary control directly. Typically, a short duration pulse is not sufficient to charge an integrating capacitor or the like generally used in association with the control element in the signal channel. The generally low impedance of the control circuit further hinders the charging process. An intermediate control signal generator is therefore employed. Heretofore, precise control of the auxiliary signal generating means, control sufficient to insure a close adherence of the gain of the signal circuit to a prescribed value, has required complex and costly apparatus.

It is the principal object of the present invention to assure precise control of the gain of a signal transmission circuit, even during prolonged periods of signal absence, in dependence on the characteristics of periodic test signal pulses passed through the circuit.

It is another object of the invention to simplify the apparatus required for adjusting the gain of a signal transmission circuit in accordance with adjustments specified by the error between a fixed reference source and the amplitude of brief periodic pulses passed through the system.

According to the present invention a variable gain device is employed in the transmission path of a signal transmission circuit such as a chain of IF amplifiers or the like. Discrete reference amplitude pulses are transmitted through the circuit regardless of the signal condition of the circuit, that is, whether or not message signals are also being transmitted by the circuit. A reference potential is provided and the amplitude of each reference pulse is compared with that of the reference potential. A signal proportional to the momentary difference between the reference amplitude pulses passed by the amplifier circuit and the reference potential is generated and employed to adjust a bistable element to one of its stable conditions according to the algebraic sign of the difference signal. Linear control signal generating means, responsive to the momentary state of the bistable device, is employed for generating a control signal which actuates the gain controlling element in the signal circuit.

Inherently the system hunts in a "seesaw" fashion from a gain slightly above a median level, i.e., a level established as normal for the circuit, to a gain slightly therebelow. Within this range, consecutive control signals of opposite algebraic sign may cause a reversal even though full correction has not been achieved. In effect, a range of indecision exists between the amplitudes of consecutive pulses that will effect the required correction within which no control is exerted in the system.

It is another object of the invention to reduce the range in which gain control is imprecise by improving the responsiveness of the system to error signals.

In accordance with an important feature of the invention, the indecision range between the maximum and minimum permissible gains is appreciably reduced by modulating the reference potential with a random frequency wave of prescribed amplitude. The modulating signal preferably is a random period square wave whose amplitude is slightly greater than the possible difference in amplitude between consecutive pilot pulses. Consequently, the bistable element is influenced by the random frequency signals superposed on the reference so that, on the average, it is in the proper state for full correction despite relatively large pulse-to-pulse input amplitude differences. At the same time, unnecessary reversals within the range of acceptable gain variation are minimized so that complete correction is more likely to be achieved. Since the frequency of the modulating signal is random, it is improbable that beats will be set up with the pilot pulses, when present, and lead to over-correction.

The technique is particularly effective in maintaining a controlled hunting action in systems where alternate pilot pulses of different frequencies and amplitudes are employed. Here, correction just slightly greater than the difference in amplitude between alternate pulses is easily secured. In such a system, without this provision of the present invention, excessive gain correction error would be inevitable.

If a considerable number of the pilot pulses is omitted, because of tests or the like being carried on in other parts of the system, for example, the amplifier gain, without other provision, would tend to become objectionably large. It would, in fact, eventually reach its limit. In accordance with another feature of the invention, a fail-safe circuit is employed to prevent erroneous gain adjustments in the event of the omission of a prescribed minimum number of test pulses. Provision is made for holding the gain of the circuit at the median level until the resumption of pilot pulse transmission.

The invention will be fully apprehended from the following detailed description of a preferred illustrative embodiment thereof taken in connection with the appended drawings, in which.

Figures 1, 3:
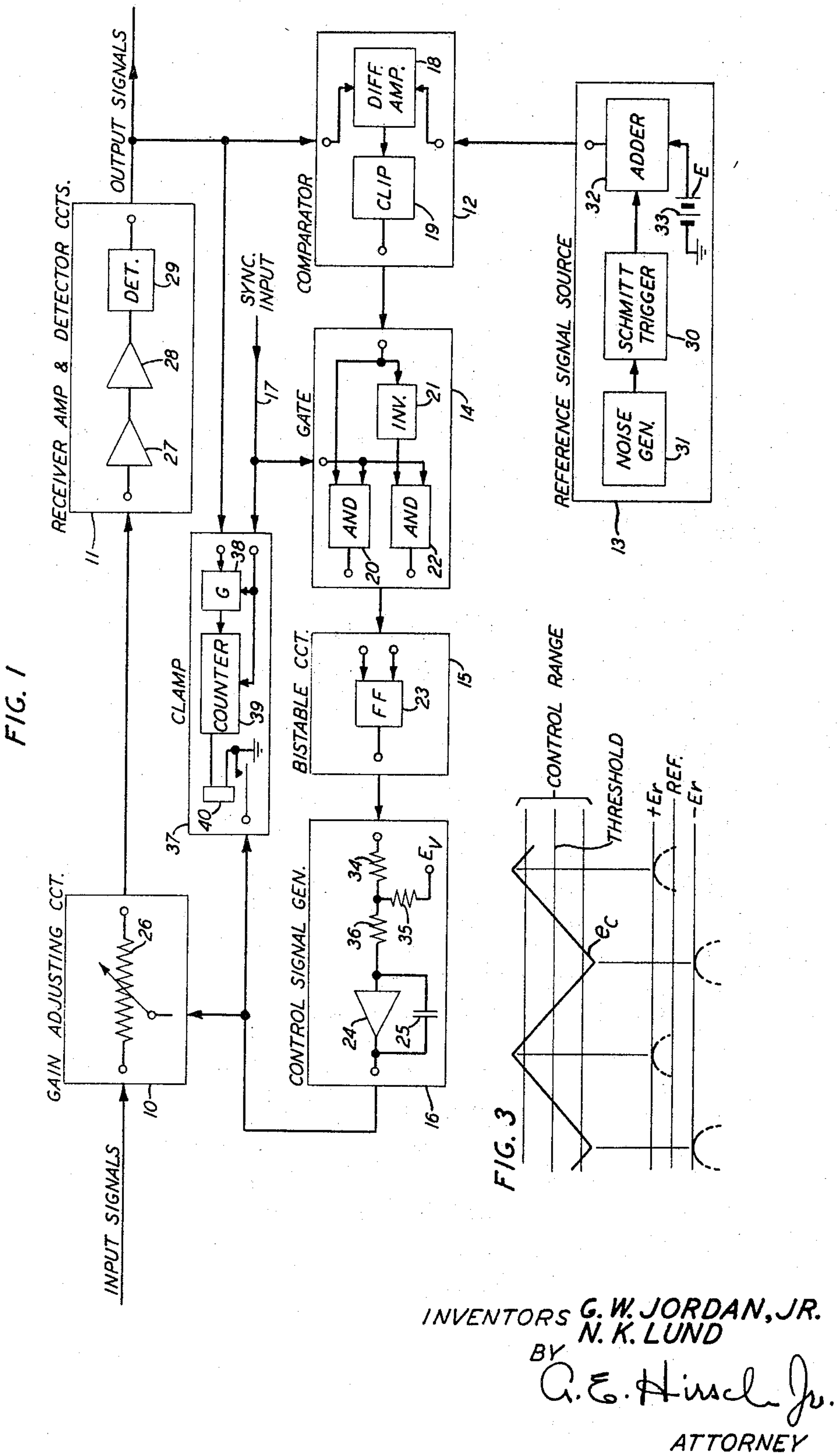
FIG. 1 is a block schematic drawing of a portion of a signal receiver circuit under control of apparatus which employs the principles of the invention.
FIG. 3 is an illustration helpful in understanding the operation of the apparatus of FIG. 1.

FIG. 1 illustrates a portion of a signal receiver circuit enhanced by the automatic gain control apparatus of the present invention. Input signals developed, for example, in the antenna and earlier amplifier circuits of the receiver are supplied by way of gain adjusting circuit 10 to the receiver amplifier and detector circuits shown schematically at 11. The gain adjusting circuit may typically include a variolosser 26 of any sort well known in the art or a gain controlled amplifier circuit. The receiver amplifier and detector circuits normally include the intermediate frequency amplifier stages 27 and 28, compressor amplifiers or the like if required, and detector 29. Output signals developed by the amplifier circuit 11 are supplied to other portions of the receiver for use as desired. It is to be understood that the several amplifier circuits 11 may be coupled by means of additional gain adjusting circuits, similar to that shown at 10, and controlled in the same fashion, for multiple point control of the gain of the signal channel.

In order to prevent the average gain of the signal channel including circuits 10 and 11, from deviating excessively from a prescribed normal value, the output signal is supplied in addition to comparator circuit 12 wherein it is matched to a reference potential supplied by reference signal source 13. The difference between the two, if any, is supplied at specified times by way of gate 14 to controlled bistable circuit 15. The bistable circuit develops a control signal for actuating control signal generator 16 which provides a linear control signal for actuating gain adjusting circuit 10. So long as the signal level supplied by circuits 11 match the reference potential, only a very small correction from pulse-to-pulse is provided. However, should the output signal be appreciably greater than or less than the prescribed reference, suitable adjustment in gain adjusting circuit 10 takes place so that the signal level at the output of circuit 11 once again regains its prescribed level.

Preferably, the gain adjustment of the signal channel takes place only during the passage of a reference amplitude test pulse, e.g., a pilot pulse, through the channel. Such pilot pulses may be supplied either to the antenna of the receiver from a test transmitter at a remote location or directly to one of the amplifier circuits preceding the circuit illustrated in FIG. 1. In a typical example, pilot pulses are supplied which have an amplitude equal to the nominal level of message signals, e.g., radar return signals or the like, supplied to the amplifier circuits. Pilot pulses with a duration of approximately eight microseconds are satisfactory. A typical example is shown at line *a* of FIG. 2. In accordance with the transmission response of the receiver circuits 11, the amplitude of the pilot pulse at the input to comparator 12 is altered so that it reflects the momentary amplification condition of the receiver circuits. With a pulse of this duration, e.g., eight microseconds, direct control of gain adjusting circuit 10 is difficult, if not impossible, with ordinary circuits. With such a short pulse, emanating from a relatively high impedance generator, the integrating capacitor used to supply the variolosser control voltage fails to charge sufficiently to actuate the mechanism. Also, the capacitor tends to discharge too quickly because the control signal generator input impedance is relatively low. Hence, the short duration pilot pulse, or more correctly, a short portion of it, is used in the present invention to control the generation of a suitable linear control signal, a ramp function, to develop the required variolosser control signal.

Pilot pulses are, accordingly, supplied to comparator 12 wherein they are matched in amplitude to the amplitude of reference signals supplied by source 13. In the simplest case, a D-C potential is supplied by source 13.

Figure 2:
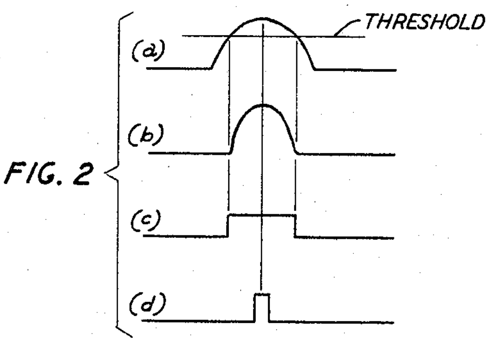
FIG. 2 is an illustration of the development of the pulse signal employed to control the bistable element in the control loop of the apparatus of FIG. 1.

As will be explained below, however, the D-C signal is preferably modulated in a random fashion. A differential amplifier 18 or the like is used to develop a suitable difference signal. Preferably, the difference circuit 18 indicates the algebraic sign of the difference by producing a signal with respect to a fixed reference of one polarity or the other. Alternatively, the reference may be used as a threshold, and signals above the threshold may be interpreted as positive differences, and signals below the threshold may be interpreted as negative differences. Difference signals, either positive or negative, as illustrated, for example, in line *b* of FIG. 2, are preferably reduced to binary form in which a pulse, representing a binary "one," indicates a positive difference, and the absence of a pulse, representing a binary "zero," a negative difference. Line *c* of FIG. 2 illustrates a typical pulse. A suitable pulse may be generated simply by passing the difference signal of line *b* through a clipper circuit 19 or the like. Other comparator circuits for developing an indication of the algebraic differences may, of course, be used.

Further to assure that the gain of the circuit is adjusted in accordance with the true peak of the pilot pulse, notwithstanding distortion of the pulse occasioned by its passage through the circuits 11, it is in accordance with the invention to select for use, e.g., by gating, only the peak amplitude portion of the pilot pulse. A one microsecond gate has been found to be satisfactory. Accordingly, the difference between the pilot pulse peak amplitude and the reference signal source, reduced essentially to a binary form but of limited duration, is supplied to gate 14 which is actuated periodically by a synchronizing signal supplied to terminal 17 from a source (not shown), e.g., a reference clock synchronously operating with the source of pilot signals. This assures that only that portion of the binary difference signal that coincides with the peak interval of the pilot signal is supplied by gate 14 to bistable circuit 15. The resultant signal passed by the gate, at sync times only, is illustrated at line *d* of FIG. 2.

Preferably gate 14 comprises a logic network responsive to the algebraic sign of the difference signal supplied by comparator 12. Thus, the binary indication of the sign of the difference appears at the input to gate 14. Assuming an algebraic positive difference, for example, a binary 1 is supplied directly to AND circuit 20 and by way of inverter 21 as a 0 to AND circuit 22. At the same sync signal interval, a binary 1 from the sync circuit is supplied to the second input points of both AND circuits 20 and 22. Only AND circuit 20, in this example, responds and provides a signal at its output. For a negative difference supplied by comparator 12, e.g., a 0, AND circuit 22 responds at sync time with a signal at its output. A logic circuit of this sort is used to supply the two output signals required to actuate a conventional two terminal flip-flop circuit 23 used in bistable circuit 15. The flip-flop, in well known fashion, provides a continuous voltage of one value on its single output lead when actuated by a signal on one of its two inputs, and a steady voltage of a second value on its output lead when set to its other bistable state by a signal on its other input terminal. Thus, the logic network of gate 14 supplies the required pair of energizing signals for changing flip-flop 23 from a first state to a second state as called for by the algebraic sign of the difference signal from comparator 12. Other bistable circuits may, of course, be used. If, for example, a circuit is used with a single input which responds to the algebraic sign of an input signal, a somewhat simpler gate network may be used.

When actuated to the first of its stable states, bistable circuit 15 supplies a step function voltage of a first value to control signal generator 16. Generator 16, which may typically include an operational amplifier 24 and an integrating capacitor 25, produces a linearly changing voltage which is employed to control gain adjusting circuit 10. For example, for the positive difference of the previous example, the linear control signal from generator 16 is effective to increase the impedance of variolosser 26 thereby to reduce the gain of the transmission path including circuits 11. For a negative difference signal, flip-flop 23 is set to its second stable state and causes integrator 24 to produce a linearly changing voltage which will smoothly decrease the impedance of the variolosser circuit.

To keep the gain deviation per sweep constant over the control range of the gain adjusting circuit, the gain adjusting circuit must be controlled logarithmically. This is accomplished by making the control input to signal output characteristic of the gain adjusting circuit 10 logarithmic. For a control voltage to increase and decrease with equal slopes, the voltage supplied to the integrating amplifier must be applied above and below "ground" reference with equal magnitudes. Since the voltage from flip-flop 23 changes from reference to some positive value only, it must be combined with an equivalent negative value to provide the proper range. This is conveniently done by combining a reference potential $E_v$ supplied by way of resistor 35 to the signal supplied by the flip-flop by way of resistor 34. With this simple potentiometer arrangement, the required symmetrical control signal is produced.

It is apparent that this system will cause a cyclic variation in the gain of the system. So long as flip-flop 23 is set to one of its states, the gain of the transmission circuit gradually increases; when set to the other, the gain gradually decreases. With periodic reference pulses this effect is quite satisfactory because it can be carefully controlled. In FIG. 3, for example, a typical quiescent control voltage $e_c$ supplied by generator 16 is illustrated. By suitably selecting the parameters of the integrator network, the slope of the control voltage may be selected so that any desired permissible variation in gain of the transmission circuit may be secured. In a typical example, a control range, or drift level, in gain of $\pm 0.05$ db is tolerable. In the worst signal condition, for example, with alternate pulses with amplitudes at the extreme range of the system, as shown at the lower portion of FIG. 3, the gain variation is just enough to cause the flip-flop continually to change state. The control voltage from the error integrator changes the receiver gain under these conditions by approximately 0.05 db per sweep, increasing on the first sweep and then decreasing on the second sweep and continuing repetitively thereafter.

Alternate pulses of different amplitude of this sort may arise in a system wherein multifrequency test signals are used in alternation, the pulses of each frequency having a discrete fixed amplitude. The pulse-to-pulse amplitude difference may be typically 2 db. In this case, it is desired to adjust the gain so that the large amplitude signal is 1 db above the reference and the small amplitude signal is 1 db below the reference. The preferred control action should cause the average pulse amplitude output to be equal to the reference amplitude. Yet, the state of the flip-flop is reversed on every pulse if the output level of the system deviates from the median. Due to the unavoidable unbalances in the circuit, such as slight differences in flip-flop states, the gain control signal will thus change until either the maximum or minimum pulse amplitudes coincide with the reference level. Therefore, the controlled output is 1 db in error even after correction.

It is in accordance with the present invention to prevent such errors, and to reduce the reaction time of the circuit. This is accomplished by insuring that bistable circuit 15 is, on the average, in the proper state despite relatively large pulse-to-pulse input amplitude differences.

To do this, the reference signal developed by source 13 is effectively modulated by a random frequency alternating signal of fixed amplitude. To insure that the pulse frequency of the reference source varies in a random fashion and is nonsynchronous with the pilot pulse repetition rate, it is convenient to develop the modulating signal by energizing a Schmitt-trigger circuit 30 or the like by means of signals issuing from a noise generator 31. The Schmitt-trigger develops a train of square wave-like pulses of random periods. This square wave train may be impressed on the reference potential value by means of adder circuit 32 and supplied to comparator 12. Alternatively, a random frequency sine wave oscillator may be employed directly and combined in adder 32 with the reference potential 33. The random variation of the reference potential thus effectively modulates the pilot pulse at a random rate.

With the modulated form of reference signal, this controlled bistable circuit 15 is reversed at proper intervals, notwithstanding the variation in pilot pulse amplitudes. Consequently, full correction in the transmission circuit may be achieved. Further, the range of indecision wherein the control circuit fails to detect slight changes is substantially reduced. In effect, control action is improved by reducing the range of indecision. It is convenient to characterize this improvement as a reduction in circuit "backlash."

Figure 4:
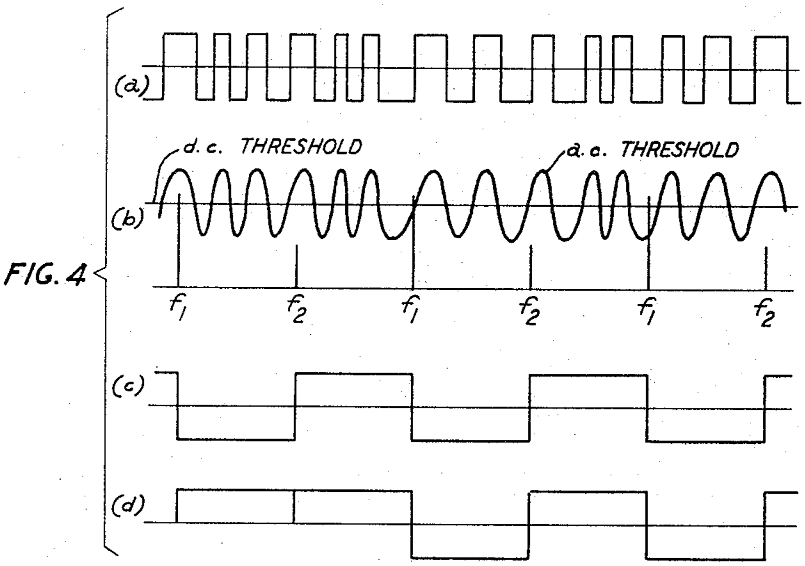
FIG. 4 illustrates various reference signals and control signals developed by the apparatus of FIG. 1.

FIG. 4 illustrates this feature of the invention. In this example, alternate pilot pulses of different frequencies, $f_1$ and $f_2$, are supplied in alternation to the transmission channel including gain adjusting circuit 10 and receiver circuits 11. The pulses of frequency $f_1$ have a first fixed amplitude and the pulses of frequency $f_2$ a second different fixed amplitude. The pulses are shown schematically in line *b* of FIG. 4. As indicated above, the wide variation in amplitude between successive pulses causes continuous oscillation of the bistable circuit and precludes full correction of the transmission channel. Line *c* of FIG. 4 illustrates the typical flip-flop output in response to the pilot pulses of line *b*.

By superimposing a random frequency modulating signal, e.g., the sine wave of line *b* of FIG. 4, this deficiency is overcome. In this case the threshold is effectively increased and decreased in a random fashion so that full correction can take place and yet excessive over excursions are avoided. In a preferred embodiment of the invention a modulating train of square waves, e.g., shown in line *a* of FIG. 4 are employed. The result is, however, in principle, the same for the two forms of modulating signal. Circuit details only are changed according to the form of modulating pulse train employed.

With the oscillating threshold in the example of line *b*, for example, the first pulse, $f_1$, is less than the momentary threshold value indicating that the gain of the transmission channel should be increased. Accordingly, a 1 signal issues from comparator 12 and eventually bistable circuit 15 is actuated to produce a positive control pulse. An example of such a pulse is shown in line *d* of FIG. 4. The next pilot pulse at frequency $f_2$ is also less than the momentary threshold and so it too causes the flip-flop to produce a positive output signal. In effect, the flip-flop is held in its positive condition and the control pulse function is bridged for the entire period controlled by pilot pulses $f_1$ and $f_2$. Without the modulated threshold it is apparent that pulse at frequency $f_2$ would have caused a reversal of the flip-flop, e.g., as shown in line *c*, even though full correction had not been achieved. The next following pulse at frequency $f_1$ is now greater than the threshold so that the flip-flop is reversed. With the random nature of the oscillating threshold, it is apparent that periods of full correction will be interspersed with periods of under correction so that on average the effective drift range of the control circuit is reduced.

Even with the improved correction provided by the features of the invention described above, a prolonged absence of pilot pulses would require that correction in one direction or the other, according to the last said position of the flip-flop, continue until the gain adjusting device reaches its limit, either positive or negative. To avoid this eventuality, it is in accordance with the invention to set the gain adjusting circuit to its median value should a prescribed number of pilot pulses fail to appear at the output of the transmission amplifier circuits. Such a fail-safe feature also prevents abnormal gain settings should any of the components of the control system fail.

The fail-safe feature includes typically a pulse omission clamp circuit 37 supplied with output signals from amplifier circuits 11 and sync pulses from source 17. It may include an AND gate 38 and counter 39 which together actuate a relay 40 or the like. Each sync pulse registers a count in the counter unless a coincident reset pulse is supplied by way of AND gate 38. Reset occurs only if a pilot pulse is available. If the counter accumulates a prescribed count, e.g., 4, because of a failure to reset, relay 40 is energized to supply a fixed potential to the control input of gain adjusting circuit 10. With suitable adjustment, ground potential supplied to the input of circuit 10 may be made to bring the gain adjusting circuit to its median value.

The above-described arrangements are, of course, merely illustrative of the application of the principles of the invention. Numerous other arrangements may be devised by those skilled in the art without departing from the spirit and scope of the invention.

What is claimed is:

1. Apparatus which comprises means, connected between the input and output of a transmission circuit supplied at said input with discrete reference amplitude pulses, for adjusting, in response to a control signal applied to a control terminal on said adjusting means, the amplitude of said pulses, means for developing a randomly varying reference potential, means, connected to the output of said transmission circuit and the output of said developing means, for producing a control signal proportional to the difference in amplitude between said randomly varying reference potential and said transmitted reference amplitude pulses, and means for applying said control signal to the control terminal of said amplitude adjusting means.

2. Apparatus as in claim 1 in which said means for developing a randomly varying reference potential comprises means for generating a reference potential, and means for asynchronously varying the magnitude of said reference potential.

3. Apparatus as in claim 1 wherein said means for producing a control signal comprises, means, responsive to the polarity of the difference in amplitude between the signals at the output of said transmission circuit and said randomly varying reference potential, for generating an intermediate signal indicative of said polarity, bistable circuit means, means responsive to said intermediate signal for selectively actuating said bistable circuit means, and integrating means actuated by said bistable circuit means for producing said control signal.

4. Apparatus as in claim 1 wherein said means for producing a control signal comprises means, responsive to the polarity of the difference in amplitude between the signals at the output of said transmission circuit and said randomly varying reference potential, for generating an intermediate signal indicative of said polarity, gating circuit means supplied with said intermediate signal for producing a first signal for intermediate signals of a first polarity, and a second signal for intermediate signals of a second polarity, bistable circuit means, connected to said gating circuit means, for generating a first output signal in response to said first signal and a second output signal in response to said second signal, means for actuating said gating circuit means for brief intervals in synchronism with the occurrence of said discrete reference amplitude pulses, and integrator means, connected to said bistable circuit means, for developing a control signal having a first characteristic in response to said first output signal and a second characteristic in response to said second output signal.

5. Apparatus as in claim 1 in combination with means responsive to the continuity of said discrete reference amplitude pulses for inhibiting said means for adjusting from responding to said control signal for prescribed discontinuities in said discete reference amplitude pulses.

6. Apparatus which comprises means, connected between the input and output of a transmission circuit supplied at said input with discrete reference amplitude pulses, for adjusting, in response to a control signal applied to a control terminal on said adjusting means, the amplitude of said pulses, means for developing a reference potential, means, connected to the output of said transmission circuit and the output of said developing means, for producing a difference signal proportional to the difference in amplitude between said reference potential and said transmitted reference amplitude pulses, means for aperiodically reversing the polarity of said difference signal at a rate in excess of the frequency of said discrete reference amplitude pulses to produce a control signal, and means for applying said control signal to the control terminal of said amplitude adjusting means.

7. Apparatus which comprises means, connected between the input and output of a transmission circuit supplied at said input with discrete reference amplitude pulses, for adjusting, in response to linear signals applied to a control terminal on said adjusting means, the amplitude of said pulses, means for developing a reference potential, means, connected to the output of said transmission circuit and the output of said developing means, for producing a difference signal proportional to the difference in amplitude between said reference potential and said transmitted reference amplitude pulses, means for aperiodically reversing the polarity of said difference signal at a rate in excess of the frequency of said discrete reference amplitude pulses to produce an intermediate signal, means, responsive to said intermediate signal, for generating a first signal indicative of the polarity thereof, means, responsive to said first signal, for generating a continuous signal of a first amplitude for positive polarity difference signals and a continuous signal of a second amplitude for negative polarity difference signals, control signal generator means supplied with said continuous signals for developing a linear signal having a first prescribed characteristic for continuous signals of said first amplitude and a linear signal having a second prescribed characteristic for continuous signals of said second amplitude, and means for applying said linear signals to the control terminal of said amplitude adjusting means.

References Cited

UNITED STATES PATENTS

| | | | |
|---|---|---|---|
| 2,509,789 | 5/1950 | Sprague et al. | 325—159 X |
| 3,137,816 | 6/1964 | McLin et al. | 325—159 X |
| 3,151,295 | 9/1964 | Haviland | 325—4 X |
| 3,196,355 | 7/1965 | Berry et al. | 325—407 |

ROY LAKE, *Primary Examiner.*

NATHAN KAUFMAN, *Examiner.*